(12) United States Patent
Ono (10) Patent No.: US 7,523,635 B2
(45) Date of Patent: Apr. 28, 2009

(54) METHOD OF PRODUCING WHEEL AND THE WHEEL

(75) Inventor: Kotaro Ono, Fukui (JP)

(73) Assignee: Washi Kosan Co., Ltd., Tokyo (JP)

( * ) Notice: Subject to any disclaimer, the term of this patent is extended or adjusted under 35 U.S.C. 154(b) by 204 days.

(21) Appl. No.: 10/568,397

(22) PCT Filed: Aug. 5, 2004

(86) PCT No.: PCT/JP2004/011238

§ 371 (c)(1),
(2), (4) Date: Mar. 29, 2006

(87) PCT Pub. No.: WO2005/014201

PCT Pub. Date: Feb. 17, 2005

(65) Prior Publication Data

US 2006/0225859 A1    Oct. 12, 2006

(30) Foreign Application Priority Data

Aug. 11, 2003   (JP) .............................. 2003-291149

(51) Int. Cl.
*B21D 22/00* (2006.01)
*B21D 28/00* (2006.01)
*B21B 15/00* (2006.01)
*B21B 27/06* (2006.01)
*B23P 17/00* (2006.01)

(52) U.S. Cl. .................. 72/356; 72/68; 72/69; 72/333; 29/894.325

(58) Field of Classification Search .............. 72/68, 72/69, 356, 405.03, 80, 94, 102, 105, 404, 72/444, 332, 333; 29/894.322–894.325, 29/894.353, 894.362

See application file for complete search history.

(56) References Cited

U.S. PATENT DOCUMENTS

| 4,450,703 | A | * | 5/1984 | McCloskey | ................ 72/342.5 |
| 4,779,329 | A | * | 10/1988 | Nordquist et al. | ............. 483/29 |
| 5,092,040 | A | * | 3/1992 | Kato et al. | ............. 29/894.324 |
| 5,454,248 | A | * | 10/1995 | Inatani | ......................... 72/84 |
| 5,568,745 | A | * | 10/1996 | Daudi | ...................... 72/353.4 |
| 6,240,765 | B1 | * | 6/2001 | Delgado et al. | ............... 72/356 |

FOREIGN PATENT DOCUMENTS

| JP | 58-12092 | 1/1983 |
| JP | 60-127040 | 7/1985 |
| JP | 61-115641 | 6/1986 |
| JP | 6-154932 | 6/1994 |
| JP | 6-285575 | 10/1994 |
| JP | 8-164438 | 6/1996 |
| JP | 2001-150089 | 6/2001 |

* cited by examiner

*Primary Examiner*—Dana Ross
*Assistant Examiner*—Teresa Bonk
(74) *Attorney, Agent, or Firm*—Jordan and Hamburg LLP (57) ABSTRACT

A method of producing a light alloy wheel with a forging technique, aiming for producing the wheel having a large-diameter disk by use of a small-scale press device, comprising: heating an intermediate product that is formed by casting or forging and has a discoid and a cylindrical thick wall, which are to respectively become disk and rim at completion, to a plasticity temperature; then, rotating the intermediate product with stopping of the rotating at interval of a predetermined angle; pressing at least a portion of the to-be disk part by molds at time of said stopping, as to push out metal into recesses on the lower mold and to thereby form holes; repeating of such rotating, stopping and pressing as to give a pattern on whole of the to-be disk part; and further press processing and finish processing on the to-be disk and the to-be rim parts.

6 Claims, 7 Drawing Sheets

A-A' cross section

Fig. 10

METHOD OF PRODUCING WHEEL AND THE WHEEL

FIELD OF THE INVENTION

This invention relates to a method of producing wheel formed of lightweight metal for a vehicle as well as such wheel.

BACKGROUND OF THE INVENTION

The wheels formed of lightweight metal that are preferably used in passenger automobiles greatly contribute for decreasing load underneath the springs and for improving maneuverability and fuel efficiency or mileage. Such wheels are produced by casting or forging as to provide ones having excellent ornamental appearances. In response to quest for wheels more lightweight and more excellent in the ornamental appearances, the lightweight metal wheels allegedly have a share exceeding 60% in wheels for the passenger automobiles. With increase of speed capacity of the passenger automobile, there is required enlargement of brake mechanism and of the wheel; thereby, diameter of the wheels increases year by year and may well soon exceed 17 inch in nowadays trend.

In producing the lightweight metal wheels, aluminum or magnesium is mainly used as material for the wheel, and the forging is preferably used in order for achieving densely packed metallographic structure and thereby for enhancing stiffness of the metal.

Method of the forging in prior art is exemplarily shown by JP-1985(S60)-127040A (Prior-Art Patent Document 1), which shows a method comprising of; a step of forging a disc-shaped work having thick-wall outer fringes; a step of forge-wise forming, from the disc-shaped work, a disk part having edges in predetermined shape and relief-wise formed predetermined window openings as recesses, or such disk part and a ring part integrally continuous with the disk part; a step of cutting out bottoms of the recesses as to form window openings; and a step of chamfering inner peripheral fringe of the window openings.

If diameter of the disk is less than about 18 inch, a press device having capacity of about 8000 metric ton is enough for pressing whole face of the disc. If the diameter of the disk exceeds the 18 inch, it is difficult to press the whole face of the disk by use of the press device of about 8000 metric ton capacity and thereby press device of about 10,000 metric ton capacity is needed.

Portion-by-portion stepwise forging technique has been known as for forging a member having large area by use of a small-scale press device. As for forming a disk of simple shape by such technique, JP-1983(S58)-12092A (Prior-Art Patent Document 2) for example shows a method for forging a beam flange for warping of yarns; in which a starting metal piece is portion-by-portion stepwise pressed as to omit a need of large-scale pressing device; and in which then obtained disk is progressively enlarged by properly changing upper mold. By this method, the flange having diameter of 30 inch or more may be obtained, while no "pattern" may be formed because the disk is drawn not only in a circumferential direction but also in a radial direction on course of the stepwise pressing.

Other than the portion-by-portion stepwise forging technique, rotation forging technique has been known and proposed by numerous prior-art documents. In principle, a tool having conical face is tilted and abutted on a work and the forming is gradually and successively made in circumferential direction by such way of pressing. Typical methods in the rotation forging technique are shown in JP-1994(H06)-154932A (Prior-Art Patent Document 3) and JP-1994(H06)-285575A (Prior-Art Patent Document 4).

In the method shown in JP-1994(H06)-154932A, a work that has a to-be-disk part and a to-be-rim part protruded in a ring shape from periphery of the disk part is prepared; and then the work is rotated and at same time compressed by a lower tool for processing outer face of the to-be-disk part and an upper tool for processing inner face of the to-be-disk part, while the to-be-rim part is abutted by a forming roller, as to form an integral wheel. In the method shown in JP-1994 (H06)-285575A, a set of upper and lower tools in which concave and convex portions are alternately formed along a circle line with a constant amplitude is used; and firstly, one of the concave portions is aligned with one of the convex portions and then pressing is made, and such forge processing is made along a whole circle by rotating the tools as from such firstly aligned position. In such rotation forging technique, material of the work is migrated in radially outward directions. Thus, a disk pattern stretched in a radial direction may be formed whereas more complicated "pattern" is not achievable.

SUMMARY OF THE INVENTION

In view of the above, it is aimed to provide a method in the forging technique for manufacturing a wheel formed of a light alloy and having a large diameter by use of a small-scale press device.

Invention-wise process for manufacturing a vehicle's wheel formed of lightweight metal comprising; heating an intermediate product that is formed by casting or forging and has a to-be disk part and a to-be rim part, to a plasticity temperature; then, rotating the intermediate product with stopping of the rotating at interval of a predetermined angle; pressing at least a portion of the to-be disk part by molds or forming tools at time of said stopping; repeating of such rotating, stopping and pressing as to give a disk-part pattern on whole of the to-be disk part; and further press processing and finish processing on the to-be disk and the to-be rim parts as to form disk and rim parts.

The plasticity temperature at above is a temperature at which plastic deformation is easily made by pressing. For lightweight metal such as aluminum and magnesium, the plasticity temperature is preferably in a range of 420-450° C. When nominal diameter of the wheel is no less than 18 inch, the diameter of the disk is no less than 17 inch. When to form the "pattern" en bloc by pressing whole surface of the disk part in such a diameter in forge processing, a press device of about 8000-ton capacity is needed. Such a large-scale press device is expensive and requires an accordingly sizable place for installing the device. Thus, it is desirable when press device having smaller scale is adoptable in producing a disk of a large diameter.

The invention-wise process enables producing of a disk having large diameter by stepwise forging, by use of a press device of smaller scale compared to fore-mentioned ones; for example by use of a press device having a capacity in a range of 1000 through 4000 ton, although required capacity may vary depending on a size of area that is pressed at a time of the stopping.

The intermediate product may be formed by pressing a billet as to form a convex-part making a hub at a center of the billet as well as a discoid at around the hub, and to have a cylindrical tube of thick wall as the to-be rim part at periphery of the discoid. Such intermediate product may be formed by expanding with successive change of tools by use of a small-scale press device because no surface "pattern" is to be formed on the discoid.

The intermediate product may be molded by casting. In general, a vertical thrust force is applied in the press device; hence, a forming tool applying the thrust force will be preferred as upper mold and the other forming tool will be preferred as lower mold.

A disk of 17 inch diameter has an area in a range of 1300 through 1600 cm². Thus, when assumed as about 4 ton per square centimeter of pressing force is needed for forming a disk-part pattern by pressing, a press device of about 6000-ton capacity is needed, in a rough estimation. When a press device of about 3000-ton capacity is used, the pressing force is not enough to apply pressing on whole of the disc. For this reason, stepwise and portion-wise forging is adopted.

Ornamental pattern on the disk of the wheel is given by forming holes on the disk. For achieving a mass-wise balance in respect of rotation, holes having same configuration are arranged in a constant interval, which interval makes one pitch of the portion-by-portion-wise forging. The upper mold is provided with one or more projections matching the configuration of the holes. As far as afforded with capacity in pressing force, plurality of the projections is formed on the upper mold. To cope with material flow due to free forging, recesses or holes are provided on the lower mold.

The lower mold has a configuration for fixing up the intermediate product so as not freely rotatable by holding the circular tube of the intermediate product from outside. The lower mold has a controller for indicating rotational angle so that rotating and its stopping of the lower mold is repeated in accordance with every pitch of the disk-part pattern. At time of the stopping, the upper mold is descended, and thus material to be pushed out at the pressing moves downward.

The upper mold presses an area slightly larger than the one pitch of the disk-part pattern, by a uniform pressing force all over the intermediate product. For replacing of the upper mold, it is preferred that a plurality of the upper mold are held or latched as slidable in a horizontal direction as shown in the JP-1983(S58)-12092A (Prior-Art Patent Document 2). Detail of the press device will be described later.

When to form holes comprising the disk-part pattern on the disk by portion-by-portion forging, it is not desirable that material at pressed portion expanded to its surroundings. Thus, ridges of mold's projections on portions for abutting peripheries around the holes are shaped as rounded or as sharp-angled ridges of 90 degree or sharper angle.

For example, at portions for forming spokes, ridges on the projections are shaped as rounded, and thereby slight bulging of material is made, as to leave faces appeared as if being forge-wise pressed. Recesses are formed on a mold part that abuts the to-be rim part at regions other than its joints with the spokes; and an air valve is attached to a portion of walls of the recesses.

When to form through holes, the upper mold having sharp-angled ridges on the projections is used for curbing flow of material at the through holes toward the to-be rim part. The upper mold for forming the recesses has protrusions having sharp-angled edges on a part of corners and having rounded faces on remaining corners, as to push out material toward the through holes in order for preventing material flow or migration toward the rim part. At finishing step, molds having a shape matching completed product are used for the forming.

When to form the holes that make a disk-part pattern, two or three varieties of the molds are used and changing of the mold is facilitated by hanging the molds from rails that are arranged on an end of the press device on its pressing side, as to decrease time required for changing the upper, molds. Detail of the press device will be described in the embodiment. Ridges along the recesses or the through holes on the lower mold at places matching the sharp-angled ridges of the projections on the upper mold are shaped as the sharp-angled ridges as in same manner, for cutting the material.

The intermediate product having been provided with the disk-part pattern on the discoid is processed on a cylindrical thick wall around the discoid, by spinning technique, as to form a rim. A method for such processing is as follows as shown in Japanese registered Patent No. 1769730 issued to the present applicant company; a mandrel having undulation that matches holes on the disk-part pattern is used; the intermediate product is rotated while the disk is held as sandwiched, and a roller is abutted with a force on the intermediate product as to form the rim in a predetermined shape.

In this way, by a small-scale press device for forging a wheel, a wheel of lightweight alloy is completed which has a disk having diameter of 17 inch or more and having an arbitrary disk-part pattern.

In the above method, the holes are formed by punching as to form a disk-part pattern, whereas also adopted is a method comprised of; forming a pre-press hole or "waste hole" (which means an additional hole prepared on beforehand of the pressing by the molds) with an area slightly smaller than one of the holes to be formed; then a projection on the lower mold is fitted into the "waste hole" as a fit-in or catching hole; and a pressing is made on the to-be rim part and to-be disk part, in a state sealed off from outside.

Figure 3:
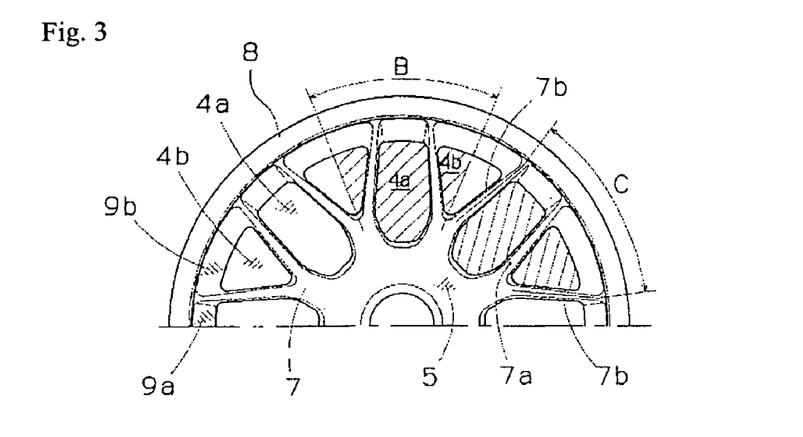
FIG. 3 is an explanatory view of the wheel, showing range or area of each of the portion-by-portion-wise forging strokes.

Please see a wheel having Y-shaped spokes on FIG. 3. When nominal diameter that usually measures a diameter of the bead seat is 18 inch, diameter of outer fringe of the outer rim is about 498 mm. Thus, an area in a plan view is estimated as 1947 cm², total area of holes in the disk is 713 cm², and thus, aperture ratio on the disk is; 713/1947=36.6%.

When the waste hole is smaller than each side of the hole by about 5 mm, aperture area is 490 cm², and thus, aperture ratio on the disk is; 490/1947=25.2%. Pressing force needed for the forging of the lightweight alloy in the sealed off state is 4 ton/cm² in a rough estimate that is made on basis of past results. Multiplying of the 4 ton/cm² with the area in the plan view gives 7788 ton; in this reason, the press device of 8000-ton capacity has been required. The waste holes alleviates required pressing force by about 25%, then the press device of about 6000-ton capacity is still required. In other words, only the press device of about 6000-ton capacity has enabled forging or press-forming of the 18-inch wheel.

In invention-wise process, a projection on the lower mold is fitted into the waste hole; then, the press device of 3000-ton capacity is used for the forging in the sealed off state; and, an upper mold of divided structure is used for the portion-by-portion-wise forging when to press on whole of the to-be rim and to-be disk parts.

Providing the holes on the wheel is effective in decreasing weight of the wheel though extent of the decreasing depends on size of the holes; and the aperture ratio of 25% may be rather small. Mass corresponding the waste holes is not included in the mass of the completed product thus required amount of the lightweight metal is increased, however, metal fragments resulted from punching may be reused.

By the invention, a 17-inch or larger wheel formed of lightweight metal and having stiffness and any disk-part pattern may be obtained by a small-scale press device.

BRIEF DESCRIPTION OF THE DRAWINGS

FIGS. 1(a)-1(c) are vertical sectional views showing an intermediate product and molds in the first embodiment of the invention, FIG. 1(a) shows a state the upper mold is placed above the intermediate product, FIG. 1(b) shows a state the upper mold moves down and thrust-wise punches holes on the discoid, and FIG. 1(c) shows an intermediate product after the processing in respect of the holes;

FIGS. 2(a)-(b) are perspective views showing positional relationship between the upper mold and a wheel, FIG. 2(a) shows the upper mold seen from below and FIG. 2(b) shows the wheel;

FIGS. 4(a)-(d) show a manner of forming depressions for the wheel on the FIG. 3, FIG. 4(a) is an explanatory view showing a range or area of one stroke of forming procedure, FIGS. 4(b) and 4(c) are sectional views showing processes of the forming, and FIG. 4(d) is a sectional view showing a portion having the depression at its completion;

FIGS. 8(a)-(d) are sectional views showing a process for forming the wheel in the second embodiment, FIG. 8(a) shows a pre-wheel, FIG. 8(b) shows the pre-wheel at a state the waste holes are punched, FIG. 8(c) is an explanatory sectional view schematically showing a pressing process, and FIG. 8(d) shows an intermediate product after the press forming;

FIGS. 9(a)-(d) are explanatory views for showing manner of forging in the second embodiment, FIG. 9(a) is a partial elevational view of the pre-wheel in which the waste holes are punched, and FIGS. 9(b)-9(d) are sectional views at A-A' section of the FIG. 9(a) for showing a course or process of the press forming.

REFERENCE NUMERALS OR MARKS 1 upper mold; 1a projection; 2 lower mold; 3 intermediate product; 3a boss; 3b discoid; 3c cylindrical thick wall; 4 hole; 5 disk; 6 wheel; 7 spoke; 8 rim; 9 depression; 13 waste hole; 18 pre-wheel; 19 to-be-rim part; 20 to-be-disk part; 21 lower mold; 22 upper mold; 23 intermediate product; 29 light alloy; 30 press device; 33 guide rail; 35 mounting base; and 39 bed.

DETAILED DESCRIPTION OF THE INVENTION

Used as a starting piece is an intermediate product integrally having; a to-be hub projection at center, a discoid surrounding the to-be hub projection, and the to-be rim part of a cylindrical thick wall. The discoid is portion-by-portion-wise successively pressed by a tool having projections and some metal is punched out to form a disk-part pattern. Then, spinning processing is made on the hollow cylinder as to complete a wheel having a disk of 17 inch or more diameters.

EMBODIMENT 1

Figure 1A:
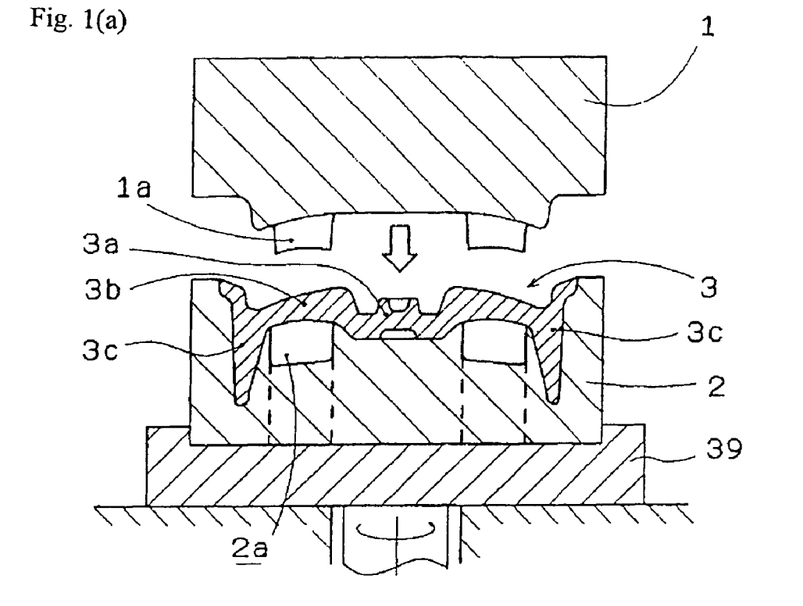

FIG. 1(a) is a vertical sectional view schematically showing an intermediate product and molds, which are used for the invention-wise rotational forging. Numeral 1 designates the upper mold that moves upward and downward in vertical direction. Numeral 2 designates the lower mold that is mounted on a bed 39 rotated by not-illustrated driving device and controlled as to repeat rotation by certain angle and subsequent stopping. Numeral 3 designates intermediate product formed of lightweight alloy of; aluminum, magnesium or the like. The intermediate product has a to-be-hub boss 3a, a discoid 3b around the boss, and a cylindrical thick wall 3c around the discoid for forming a rim. Though not illustrated, the intermediate product and the molds are heated by burners at around the molds so as to be maintained at a temperature range of 420 through 450° C., at which the intermediate product easily undergo a plastic deformation. The upper mold 1 having projections 1a moves downward by a predetermined distance and thus presses the discoid 3b to form a disk pattern comprised of holes or recesses.

Figure 1B:
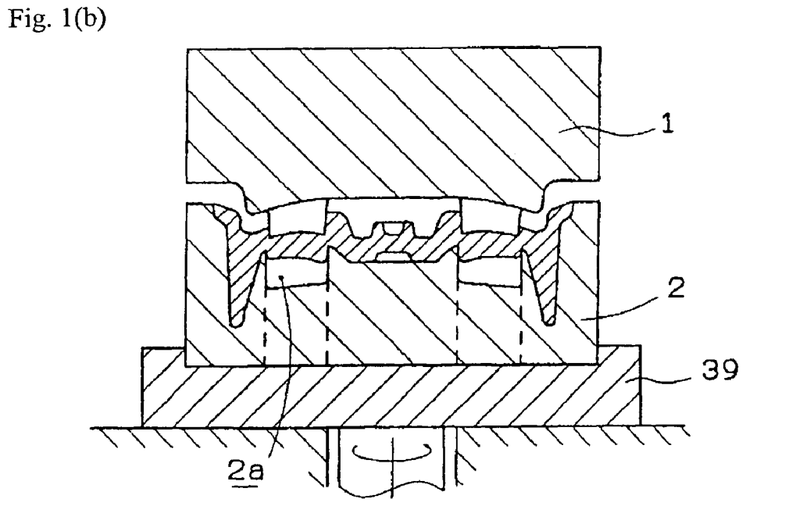
Figure 1C:
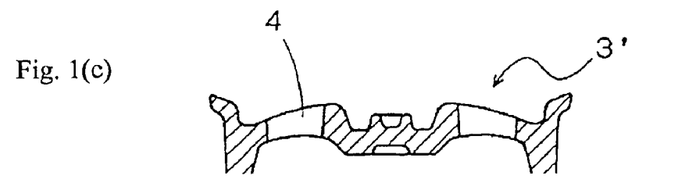

FIG. 1(b) is a vertical sectional view showing a state the upper mold 1 moves down and the projections 1a punches the discoid 3b. Metal pieces taken out by the punching move into the recesses 2a. The recesses may be replaced by holes as indicated by broken lines. The depth-wise distance the projections 1a push out on or through the discoid 3b is about 2 through 5 mm at every pressing motion. After retreating of the upper mold, the lower mold rotates by one pitch of the disk pattern and then stopped. Thereafter, the upper mold moves down again as to press down on or through portions of the discoid by the predetermined depth-wise distance. Such processing is repeated as to form a disk pattern comprised of the holes that are punched out by the pressing. FIG. 1(c) is a vertical sectional view showing the intermediate product 3' after forming the holes 4 on the discoid.

Figures 2A, 2B:
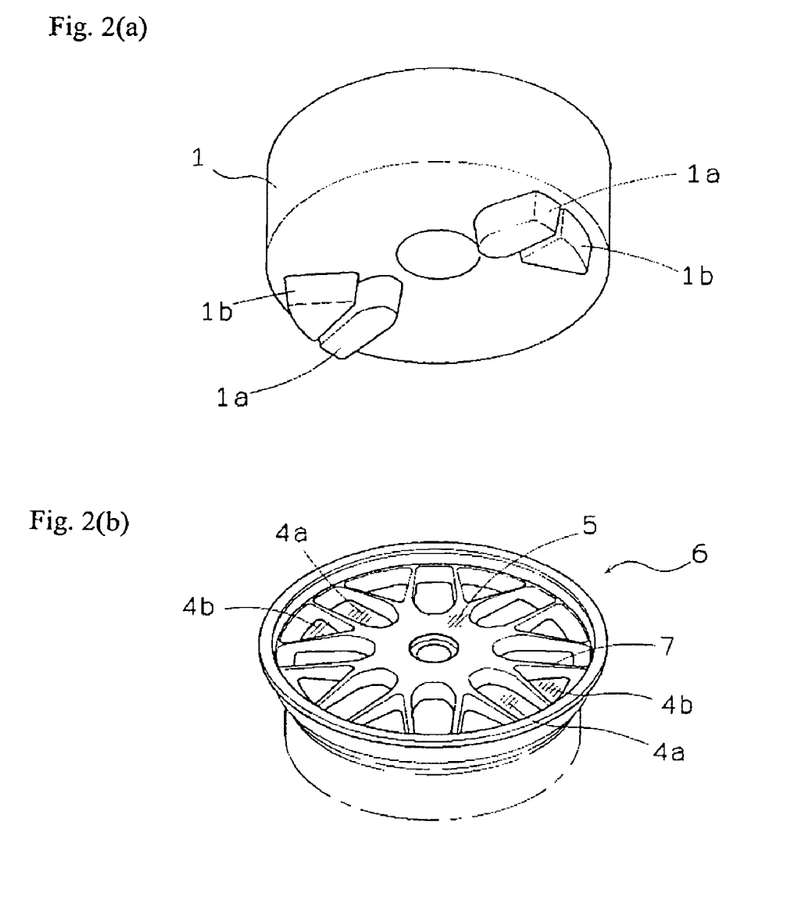

FIG. 2(b) shows an example of a wheel 6 and its pattern on the disk 5, where punching or pressing on portion of the disk has been made by projections 1a and 1b. The projections may be formed not only on one portion of the disk but also on a plurality of portions of the disk so far as the capacity of the press device allows. Conversely, if capacity of the press device is insufficient for forming a portion of the predetermined pattern by one pressing, molds of a plurality of kinds are used by successive changing of the molds, as to step-by-step-wise achieving clearer and clearer hole or recess pattern on such a portion.

FIG. 2(a) is a perspective view of the upper mold seen from below, which has two pair of projections in a centrosymmetry arrangement as two different projections are arranged to be adjacent with each other. By such configuration of the mold, balancing is easily achieved and production efficiency is enhanced to be two-folded.

One of the two pair of the projections 1a are for holes 4a on the disk 5, and the other projections 1b are for other holes 4b. Because the pressing is made to every pitch of the pattern contrary to en bloc pressing on whole of the discoid 3b, bulging up on spokes 7 (please see FIG. 2(b)) is expected to be slight. Thus, the thickness of the disk is almost equal to depth-wise dimension of the spokes. Nevertheless, filets in a manner of wrought surface texture may be formed on upper faces of the spokes. Whereas the intermediate product shown in FIG. 1(a) is produced by either of forging and casting, forged one has more densely packed metallographic structure and higher mechanical strength. Thus, smaller thickness of the disk may be adopted when the forged one is adopted. After forming the holes on the discoid, cutting is made on reverse side of the discoid as to complete the disk.

Typical one of the lightweight-metal wheel has holes on areas other than the spokes, thus area or range of the pressing may be classified into two categories as shown in FIG. 3. The disk 5 has; the Y-shaped spokes 6, the holes 4a and 4b, and depressions 9a and 9b at along joint of the spokes with the rim 8. A range indicated by reference symbol of "B" encompasses one of the hole 4a and two halves of the other kind of holes 4b as suggested by hatchings in the figure. When the portion-by-portion-wise forging is made by such range of the "B", each branch of the spokes is sandwiched from both sides, thus a slight bulging up is made as to form an appearance of wrought surface texture. Holes are formed on areas having the hatching in the figure, thus such pressing is preferred in making narrow ones of the spokes.

In a range indicated by reference symbol of "C", spoke 7a is sandwiched from both sides and spoke 7b is free from such sandwiching. In this way of portion-by-portion-wise forging, depth-wise stroke of each pressing motion is set to be small as to avert deformation or distortion of the spokes, or in otherwise, the projections on the mold are configured such that punching is made almost vertically.

Apart from the example shown in the drawings, when the spokes themselves are thick in plan view such as a case of 5-spokes wheel, extent of deformation or distortion of the spokes is small even when the depth-wise stroke of pressing motion is large. Because successive pressing is made by successively rotating the lower mold, depth-wise stroke is suitable in a range of 2 through 5 mm, and is appropriately selected depending on shape of the spokes. The areas of pressing by one stroke of the upper mold are set to be slightly larger than those indicated by "B" or "C" as to press and flatten out impartial distribution of the metal at seams between the areas of successive strokes.

Figure 4A:
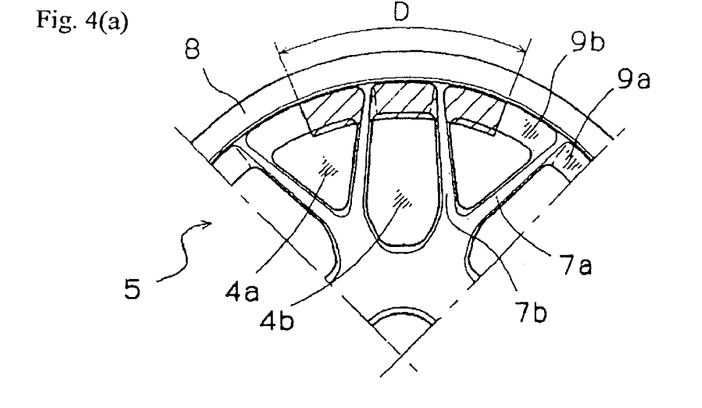
Figure 4B:
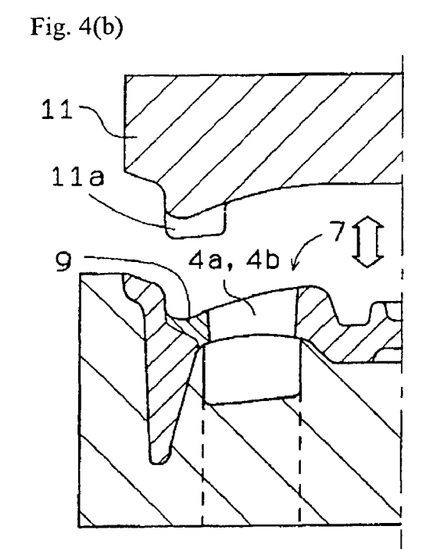
Figure 4C:
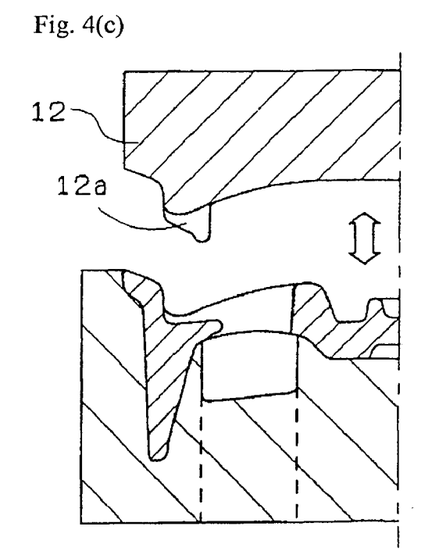
Figure 4D:
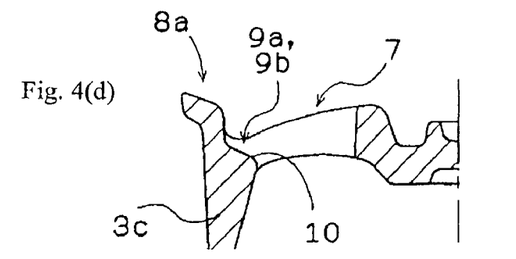

A way of forming the depressions 9a and 9b at around junctures of the spokes 7 with the rim 8 will be explained by use of FIGS. 4(a)-4(d). FIG. 4(a) is an elevational view of the disk in a final product. Holes 4a and 4b have been already punched out, and a range of pressed by one stroke is indicated by "D" in the figure; and FIG. 4(d) shows a partial section in the final product. The intermediate product at a stage to form the depressions 9a and 9b has a shape just after the punching out of the holes 4a and 4b and has leftover portions 9 remained after the punching. At a time the forming is completed, bottoms 10 of the depressions are inclined and tapered toward the holes.

Therefore, the metal of the leftover portions 9 has to be moved toward the holes 4a and 4b. Thus, upper mold 11 having the projections 11a as shown in FIG. 4(b) is repeatedly applied to press out the metal of the leftover portions 9 toward the holes 4a and 4b, so as to be deformed to a state shown in FIG. 4(c). Then, upper mold 12 having the projections 12a as shown in FIG. 4(c) is applied as to form the depressions 9a and 9b shown in FIG. 4(d). Simultaneously, the joints of the spokes 7 with the rim 8a are completed.

Various sectional shapes may be adopted for the joints. Inclined faces of the depressions 9a and 9b have a visual effect in that diameter of the disk appears to be large, has a structure of improving strength of the joints and the rims, and are used as faces for mounting an air valve. In case of two-piece wheel, the inclined faces are used for mounting fastener bolts for connecting the rim and disk parts. Shaping of the joints is not limited to the shown examples, and the face for installing the air valve may be on outer rim as to have a different sectional view.

In an explanation made hereto, the holes in the disk pattern are formed as gradually enlarged in the portion-by-portion-wise forging. Nevertheless, the holes may be formed merely by the punching, depending to the disk pattern. In such case, fillets are not formed on upper face of the spokes, and thus, finishing processing is needed for removing burrs and chamfering or the like.

Figure 5:
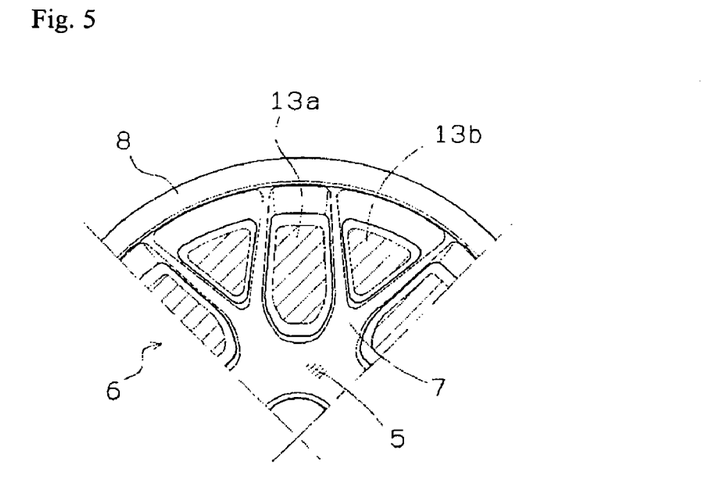
FIG. 5 is an explanatory view showing another embodiment of providing waste holes.

In another way of forming the holes by punching, waste holes 13a and 13b are formed on beforehand as shown by the hatchings in the FIG. 5. In case of the portion-by-portion-wise forging, when the projections on the mold are applied on the discoid, the holes tend to become larger than intended, by friction of drag of the metal. To cope with this, the waste holes smaller than the predetermined holes are firstly formed by punching machine, and then, the projections on the mold are abutted and pressed on the discoid. By this way, the metal tends to "flow" toward the waste holes, and thereby, precision of the disk pattern is increased and the required thrust force of the mold become smaller.

Figure 6:
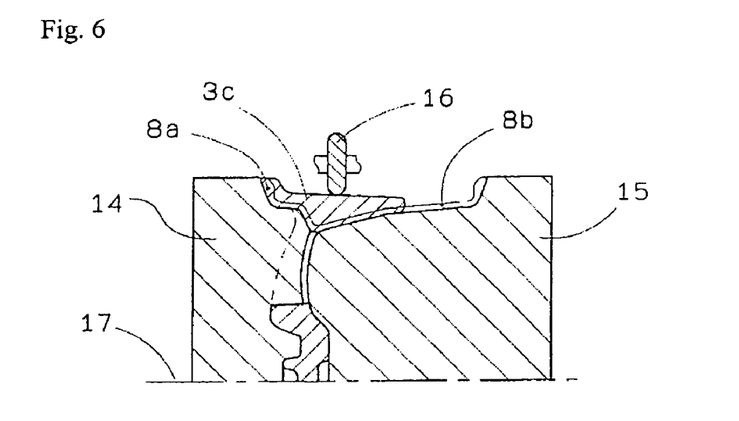
FIG. 6 is a sectional view showing a state of forming the rim by the spinning.

When processing in respect of the holes on the discoid and thus forming of the disk pattern are completed, the intermediate product is taken out from the lower mold. Then, spinning processing is made to the intermediate product as follows, as shown in FIG. 6. The intermediate product is held as sandwiched at the discoid by the mandrels 14 and 15 and is rotated about center axis 17. In this state, a spinning roller 16 is applied with pressing force as to form the rim 8a and 8b and complete the one-piece integral wheel.

EMBODIMENT 2

This embodiment is made by taking account the fact that the waste holes alleviate extent of thrust force of the upper mold, whereas it has been mentioned that the waste holes 13a and 13b facilitate the "flow" of the metal in an explanation with respect to the FIG. 5.

Figure 8A:
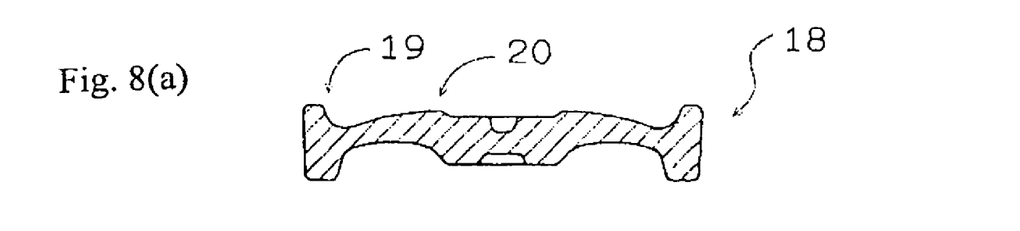

In this embodiment, firstly, a pre-wheel 18 shown in FIG. 8(a) is formed by the portion-by-portion-wise forging from a billet formed of lightweight metal. The portion-by-portion-wise forging here is made in a manner that; the lower mold is rotated by a predetermined angle and then stopped; subsequently, the upper mold moves down and presses a portion of the billet; and such process is repeated, as to expand the billet.

Figure 8B:
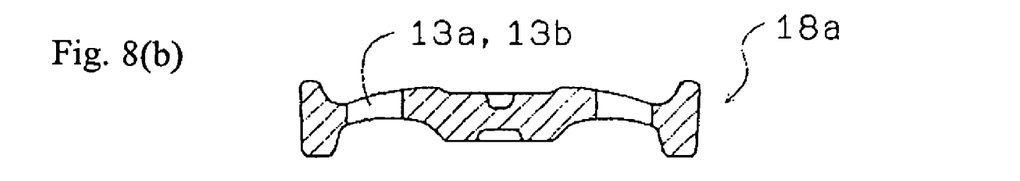

The pre-wheel 18 is disk-shaped and has a pre-rim 19 on its periphery and a pre-disk 20 on center part. Subsequently, as shown in FIG. 8(b), waste holes 13a and 13b are punched out as to form a punched pre-wheel 18a.

Figure 8C:
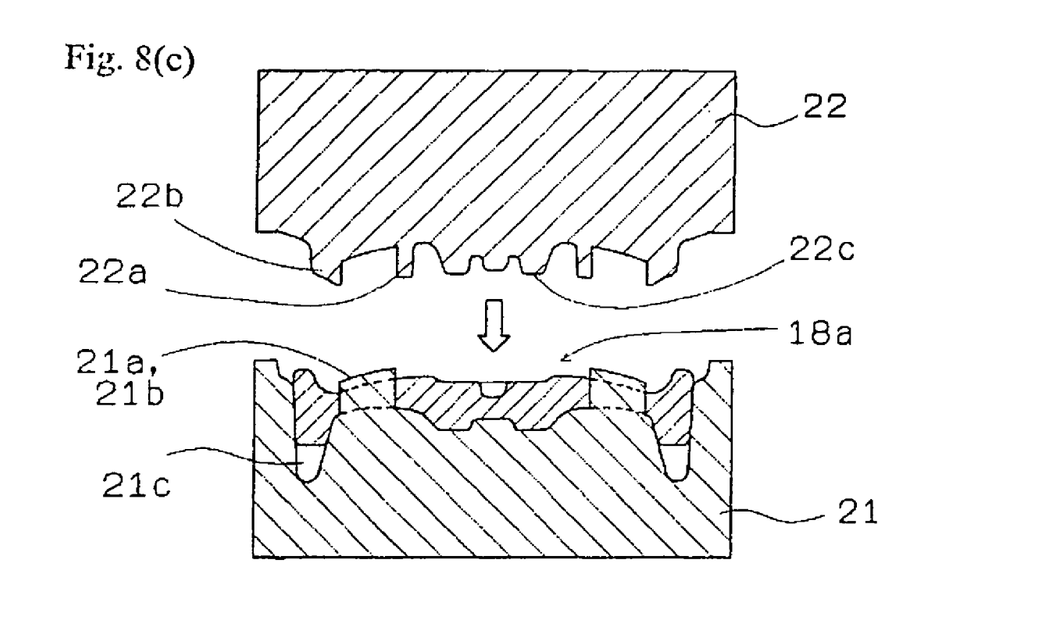
Figure 8D:
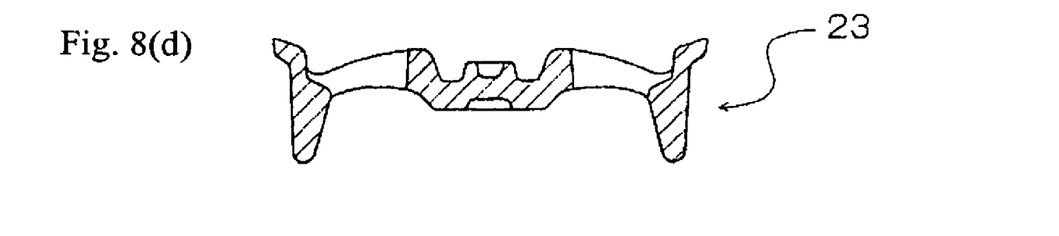

FIG. 8(c) is a sectional view for indicating outline of the forging process. The lower mold 21 has projections 21a and 21b for fitting the waste holes 13a and 13b and has a recess 21c for receiving a deforming portion at time of the pressing. The upper mold 22 has, on its pressing face, projections 22a for pressing portions around the waste holes, projections 22b for forming the rim, and a projection 22d for forming a screw hole at center of the disc. FIG. 8(d) is a sectional view of the intermediate product 23 after the press forming. Detail of the press forming is explained below.

In a structure explained above, the upper mold 22 moves down with the lower mold 21 being held at fixed posture, and then inside or cavity between the molds is sealed off from the outside. The waste holes are excluded from an area being pressed, thus, thrust force of the upper mold is alleviated by an areal ratio of the waste holes.

Figure 7:
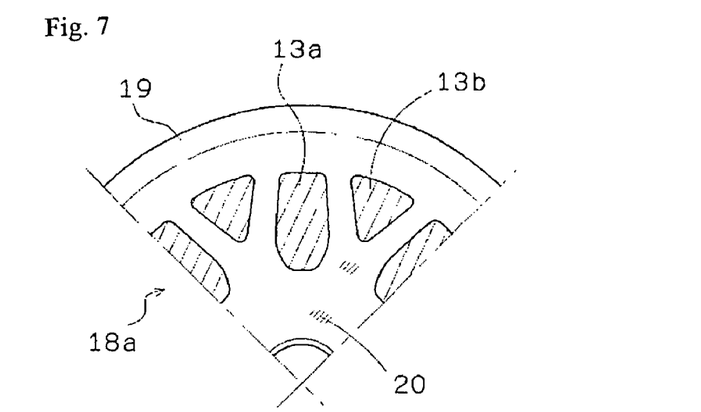
FIG. 7 is a partial elevational view of a pre-wheel in which waste holes are punched, in second embodiment.

In case of a layout of Y-shaped spokes shown in FIG. 7, total area of the waste holes is about 25% of the overall area on front face of 18-inch wheel. At a time the upper mold moves down and projections 22a, 22b and 22c begin to contact with the pre-wheel 18a, the pre-wheel is pressed only at areas matching the projections, instead of whole face of the pre-wheel. Thus, sum of the areas is very small and less than 20% of the whole face.

Whereas en bloc pressing on whole face of the pre-wheel for 18-inch wheel requires the press device of 8000-ton capacity, the above manner of the pressing is roughly estimated to merely require one having 20% of that; that is, the press device of 1600-ton capacity. In actual sense, the above manner of the pressing in this case requires the press device of 2000-ton capacity because some energy or thrust force is consumed for plastic deformation of the thrust-outing metal.

At a time the upper mold with its projections moves down to almost lower end of its stroke, whole of the pre-wheel that has been deformed by the plastic thrust-out flow and include such thrust-out metal is pressed; thus, the press device of the 8000-ton capacity is appeared to be required on first glance. Nevertheless, due to the alleviation by the waste holes, at least 25% of the 8000-ton capacity is alleviated, thus, the press device of 6000-ton capacity is enough.

Figure 9A:
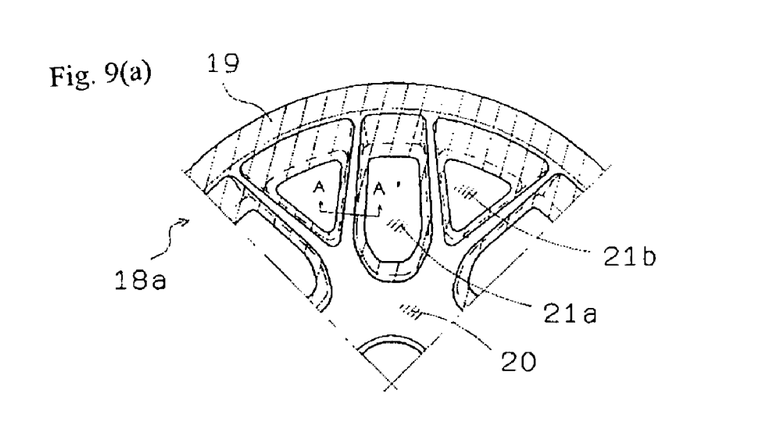

FIGS. 9(a)-9(d) are views for explaining a manner of forging in this embodiment. FIG. 9(a) is a partial elevational view of a punched pre-wheel 18a that has the waste holes having been punched out. The waste holes are fitted with the projections 21a and 21b on the lower mold; and formed are to-be rim part 19 on periphery and to-be disk part 20 on center part. Hatching in the FIG. 9(a) indicates an area on which projections on the upper mold presses.

Figure 9B:
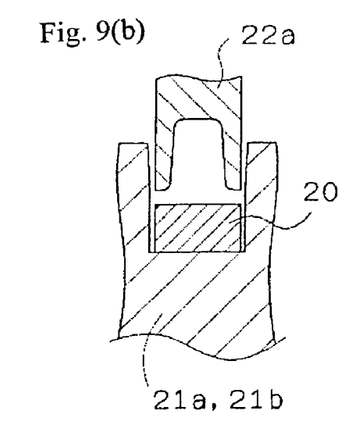
Figure 9C:
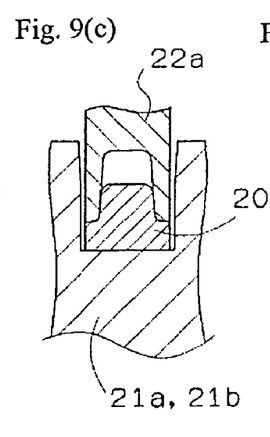
Figure 9D:
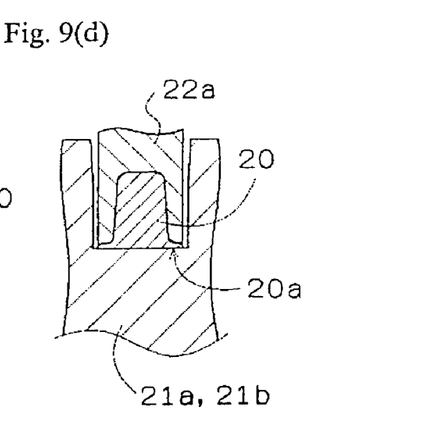

FIGS. 9(b)-(d) are sectional views for a section indicated by A-A' on the FIG. 9(a) and show a manner of pressing the to-be disk part 20 by the projections 22a on the upper mold, which press portions around the waste holes. On course of moving down of the upper mold, the to-be disk part 20 gradually bulges up by the forging at a sealed-off state. Then, in a stage shown in FIG. 9(d), the projections do not contact with the lower mold as to leave marginal-thickness fins 20a at lowest end of the stroke of the upper mold. The marginal-thickness fins are removed after the forging, by a lathe turning machine.

At a time of transition from a stage of FIG. 9(c) to a stage of FIG. 9(d), upper faces of the to-be rim part 19 and the to-be disk part 20 are rather similar with those of a wheel of completed product. Thus, in this transition stage, almost whole area on the pre-wheel is pressed, and thereby, the press device of 6000-ton capacity is needed for the en bloc forging as mentioned before. Nevertheless, when the press device of 3000-ton capacity is used, the upper mold is divided to an appropriate number in accordance with repeating pattern on the mold; and the lower mold is fixes to be stationary after rotating a predetermined angle. Thereafter, thus divided upper mold is descended as to make the pressing. For example, the upper mold is divided to four blocks, two of them are symmetrically arranged and move down to press the parts indicated in the FIG. 9(a). Then, the lower mold is rotated by 45 degree and then held in a fixed position, and thereafter, the pressing is repeated as to reach a state shown in FIG. 9(d).

In such way of the portion-by-portion-wise forging, transition to the state of the FIG. 9(d) should be made step by step as to secure uniformity of the metallographic structure of the pre-wheel on course of the deformation. At a transition from a stage of FIG. 9(b) to a stage of FIG. 9(c), non-divided or integral one of the upper molds is used, and then divided ones are used at a transition from a stage of FIG. 9(c) to a stage of FIG. 9(d).

In the Embodiment 1 and the Embodiment 2, changing of the upper mold is needed. By use of FIG. 10, an easy way of the changing will be explained below. At lower end of the vertically driving mechanism of the press device 30, a guide rail(s) 33 are arranged in a horizontal direction. Several ones of the upper molds (two in the figure) are mounted on lower face of mounting base 35 that has traveling rollers 34, as to run along the guide rail(s) 33. The mounting base 35 is moved by a drive mechanism 36 for generating a thrusting power such as a hydraulic cylinder or a motor, so as to change the upper mold 31.

Figure 10:
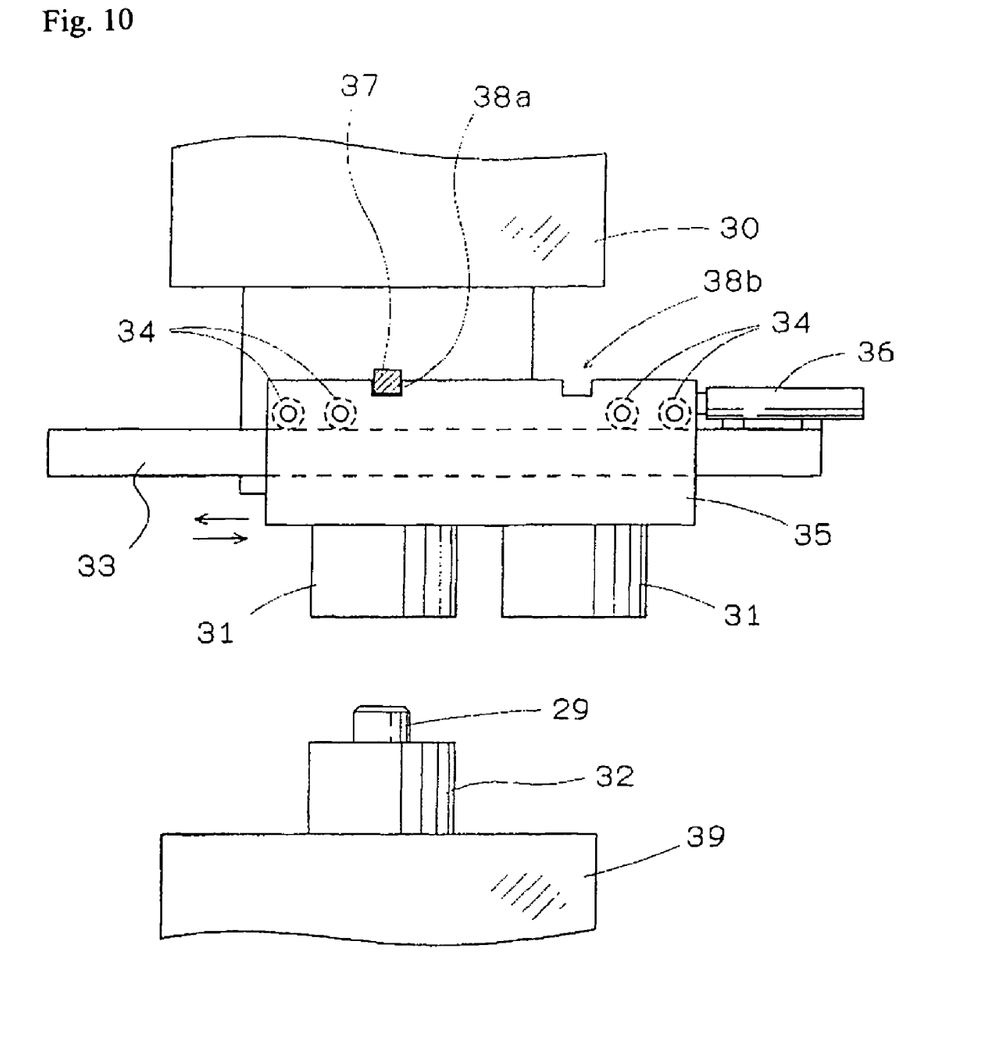
FIG. 10 is a side view of the press device for explaining a manner of changing the upper mold, in the first and second embodiments.

When positioning pin 37 on the press device 30 fits into a first latching recess 38a formed on the mounting base 35, first upper mold 31 is located over the lower mold 32. When positioning pin 37 on the press device 30 fits into a second latching recess 38b on the mounting base 35, second upper mold 31 is located over the lower mold 39.

When a lightweight metal body 29 is subjected to hot forging by use of the first and second upper molds and changing the upper molds in a manner as above, the changing of the upper mold is made in a short time. Thus, no reheating of the pre-wheel 18a or the like is needed at occasions of changing the molds, so that forging on the lightweight metal body 29 is made without interruption or pause.

The lightweight metal body 29 may be solid cylindrical billet, the intermediate product 3 of the Embodiment 1, the pre-wheel 18a of the Embodiment 2, or the like. The bed 39 has a mechanism for rotating the lower mold by a predetermined angle and then fixing the lower mold to be stationary.

INDUSTRIAL APPLICABILITY

Portion-by-portion-wise forging method of present invention enables forming of large-diameter disk by use of a small-scale press device, and thus decreasing equipment or facility cost and simplifying the molds. Moreover, surfaces of the disk pattern make wrought face, and hence, wheel product is by no means inferior to that formed by the en bloc forging by use of a large-scale press device.

What is claimed is:

1. A method of manufacturing a vehicle's wheel formed of lightweight metal, comprising;
preparing a first forming tool, which has on a pressing face thereof, recesses or holes that are arranged in a rotational symmetry of predetermined angle around a center axis, said first forming tool further including an annular recess;
preparing a second forming tool, which has on its pressing face, one or more projections only within a certain angular region about a corresponding center axis;
preparing an intermediate product by casting or forging so as to integrally form at least a center part and a discoid part, which respectively correspond to a hub and a disk of the wheel, said casting or forging further forming a cylindrical tube of thick wall which corresponds to a rim of the wheel, said cylindrical tube of thick wall being integrally formed with said center part and said discoid part of the intermediate product;
heating the intermediate product to a plasticity temperature;
placing the intermediate product so as to be held coaxially on the first forming tool, the cylindrical tube being received in said annular recess of the first forming tool;

positioning the second forming tool relative to the first forming tool, so as to be coaxial with the first forming tool and so that each of the projections is positioned to match one of said recesses or holes;

pressing a portion of the discoid part by thrusting the second forming tool relative to the first forming tool as to punch out one or more holes on the portion of the discoid part or to forge the portion of the discoid part;

retreating the second forming tool relative to the first forming tool, after the pressing;

rotating the first forming tool around its center axis by said predetermined angle, relative to the second forming tool, after the retreating; and repeating the pressing, the retreating and the rotating, until said pressing is made for every one of said recesses or holes on the first forming tool.

2. A method of manufacturing a vehicle's wheel according to claim 1, further comprising;

preparing a third forming tool which has, on its pressing face, one or more projections only within a certain angular region about a center axis thereof;

positioning the third forming tool relative to the first forming tool, so as to be coaxial with the first forming tool and so that each of the projections is positioned to match an adjacency of one of said recesses or holes;

pressing a portion of the discoid part by thrusting the third forming tool relative to the first forming tool so as to forge said adjacency of one or more of said recesses or holes;

retreating the third forming tool relative to the first form, after the pressing;

rotating the first forming tool around said center axis thereof by said predetermined angle, relative to the third forming tool, after the retreating; and repeating of the pressing, the retreating and the rotating, until said pressing is made on said each adjacency for every one of said recesses or holes on the first forming tool.

3. A method of manufacturing a vehicle's wheel according to claim 2, further comprising:

finishing with a fourth forming tool that has projections, each of which corresponds to one of the projections of the third forming tool, so as to finish a pattern of holes on the disk and depressions on a rim of the wheel.

4. A method of manufacturing a vehicle's wheel according to claim 1, further comprising:

providing waste holes on the discoid part of the intermediate product before said placing, as arranged in a rotational symmetry of said predetermined angle around a center axis of the intermediate product;

wherein each of the waste holes is smaller than a corresponding one of said recesses or holes, and is positioned to match the corresponding one of said recesses or holes at a time of said positioning.

5. A method of manufacturing a vehicle's wheel according to claim 1, wherein ridges of said projections on the second forming tool, which are for punching the holes on the discoid part, are shaped as sharp-angled in a sectional view along the center axis, at a 90 degree or sharper angle.

6. A method of manufacturing a vehicle's wheel according to claim 5, wherein a distal end surface of each of said projections is shaped as concave so that said ridges of the projections are shaped as sharp-angled at an angle less than 90 degrees.

* * * * *